(12) United States Patent
Lin et al.

(10) Patent No.: US 10,594,050 B1
(45) Date of Patent: Mar. 17, 2020

(54) INTEGRATED LOCKING AND SEALING FASTENER WITH ELECTRICAL CONDUCTIVITY

(71) Applicant: TAIWAN SELF-LOCKING FASTENERS IND CO., LTD., Taoyuan (TW)

(72) Inventors: Tsann-Yeu Lin, Taoyuan (TW); Shih-Tsai Tsai, Taoyuan (TW)

(73) Assignee: TAIWAN SELF-LOCKING FASTENERS IND CO., LTD., Taoyuan (TW)

( * ) Notice: Subject to any disclaimer, the term of this patent is extended or adjusted under 35 U.S.C. 154(b) by 0 days.

(21) Appl. No.: 16/388,371

(22) Filed: Apr. 18, 2019

(51) Int. Cl.
*H01R 4/30* (2006.01)
*H01Q 1/12* (2006.01)
*F16B 39/22* (2006.01)
*F16B 1/00* (2006.01)

(52) U.S. Cl.
CPC .......... *H01R 4/302* (2013.01); *F16B 39/225* (2013.01); *H01Q 1/1207* (2013.01); *H01R 4/307* (2013.01); *F16B 2001/0064* (2013.01)

(58) Field of Classification Search
None
See application file for complete search history.

(56) References Cited

U.S. PATENT DOCUMENTS

| | | | | |
|---|---|---|---|---|
| 3,831,213 A * | 8/1974 | Bedi | ......................... | B23G 9/00 470/11 |
| 4,671,583 A * | 6/1987 | Olson | ..................... | B64D 45/02 439/801 |
| 7,950,885 B2 * | 5/2011 | Rosenkranz | ........ | F16B 25/0026 411/258 |
| 9,033,631 B2 * | 5/2015 | Greenberg | ............ | F16B 33/002 411/82 |
| 10,072,695 B2 * | 9/2018 | Maurel | ................. | F16B 33/008 |

* cited by examiner

*Primary Examiner* — Xuong M Chung Trans
(74) *Attorney, Agent, or Firm* — Juan Carlos A. Marquez; Marquez IP Law Office, PLLC

(57) ABSTRACT

An integrated locking and sealing fastener with electrical conductivity is revealed. The integrated locking and sealing fastener with electrical conductivity includes a fastener with a surface and a conductive anti-loosening coating. A part of the surface of the fastener is a fastening contact surface and the conductive anti-loosening coating is formed on the fastening contact surface. The conductive anti-loosening coating consists of an anti-loosening portion and a conductive portion mixed with each other. The anti-loosening portion is made from polyamide (PA) resin, acrylic (PMMA) resin, polyethylene, epoxy resin, silicone, rubber, or the combinations. The conductive portion is made from materials including carbon black, metal powders, a silver wire, graphite, or the combinations. The coating on the fastener not only prevents loosening and leakage but also provides electrical conductivity.

6 Claims, 12 Drawing Sheets

INTEGRATED LOCKING AND SEALING FASTENER WITH ELECTRICAL CONDUCTIVITY

BACKGROUND OF THE INVENTION

1. Technical Field

The present invention relates to a locking and sealing fastener with electrical conductivity, especially to a locking and sealing fastener with electrical conductivity being applied to products with requirements for fastening connection, electrical conductivity, loosening resistance and sealing such as antenna fasteners and ground screws.

2. Description of Related Art

With the progress of wireless communication technology, people can receive a large amount of information anywhere and anytime. Thus the demand for outdoor antennas and grounding devices that provides path for leakage current is significantly increased. In order to avoid damages of the outdoor communication devices caused by rain infiltration and easy maintenance, thread-locking adhesives are used in joints of common antenna fasteners or ground screws to prevent water penetration.

Refer to FIG. 1A and FIG. 1B, thread-locking adhesive P20 and silver paste P21 are coated on a part of screw threads P30 of an antenna fastener 110 when the conventional antenna fastener 110 is applied to the antenna for connection to an antenna base. The thread-locking adhesive P20 is used for seal performance between the antenna fastener 110 and the antenna base. But the thread-locking adhesive P20 is made from insulating materials. After passing through the screw threads P30 of the fastener, current flow CF1 is blocked by the thread-locking adhesive P20. Only current flow CF2 reaches the antenna base through the silver paste. Thus the signal transmission efficiency of the antenna is reduced. Moreover, both the thread-locking adhesive P20 and the silver paste P21 should be coated on the antenna fastener 110 in order to make the antenna fastener 110 have loosening resistance, sealing effect and electrical conductivity. Thereby the manufacturing process of the fastener is time-consuming and labor-intensive.

As shown in FIG. 2A and FIG. 2B, a conventional ground screw provides a ground connection between a circuit board 401 and a metal case 403. The circuit board 401, a boss 402 and the metal case 403 are connected and fixed by the ground screw 120 in which the thread-locking adhesive P20 is coated on a part of screw threads P30 thereof. The thread-locking adhesive P20 is closely connected to screw threads P40 of the boss 402 to prevent the ground screw 120 and the boss 402 from loosening or falling out. However, current flow CF1 passing through the screw threads P30 of the ground screw 120 is blocked by the thread-locking adhesive P20 made from insulating material. Without the electrical conductivity, the ground screw 120 coated with the thread-locking adhesive P20 is unable to be grounded effectively. Thus a conducting wire 405 is added to connect solder joints 404 on the circuit board 401 and the metal case 403 respectively for grounding current flow 2 (CF2).

SUMMARY OF THE INVENTION

Therefore it is a primary object of the present invention to provide an integrated locking and sealing fastener with electrical conductivity for solving the problem of electrical conductivity caused by locking and sealing coating over fasteners.

This present invention provides an integrated locking and sealing fastener with electrical conductivity according to the present invention comprising: a fastener having a surface provided with a fastening contact surface formed by a part of the surface; and a conductive anti-loosening coating that is arranged at the fastening contact surface and including an anti-loosening portion made from polyamide (PA) resin, acrylic (polymethyl methacrylate, PMMA) resin, polyethylene, epoxy resin, silicone, rubber, and combinations thereof, and a conductive portion that is mixed in the anti-loosening portion and made from carbon black, metal powders, a silver wire, graphite and combinations thereof; thereby the fastener provides not only anti-loosening effect but also electrical conductivity.

Implementation of the present invention at least produces the following advantageous effects:
1. The fastener has anti-loosening effect.
2. The fastener is protected against fluids such as air/liquid.
3. The fastener has electrical conductivity.

The features and advantages of the present invention are detailed hereinafter with reference to the preferred embodiments. The detailed description is intended to enable a person skilled in the art to gain insight into the technical contents disclosed herein and implement the present invention accordingly. In particular, a person skilled in the art can easily understand the objects and advantages of the present invention by referring to the disclosure of the specification, the claims, and the accompanying drawings.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1A:
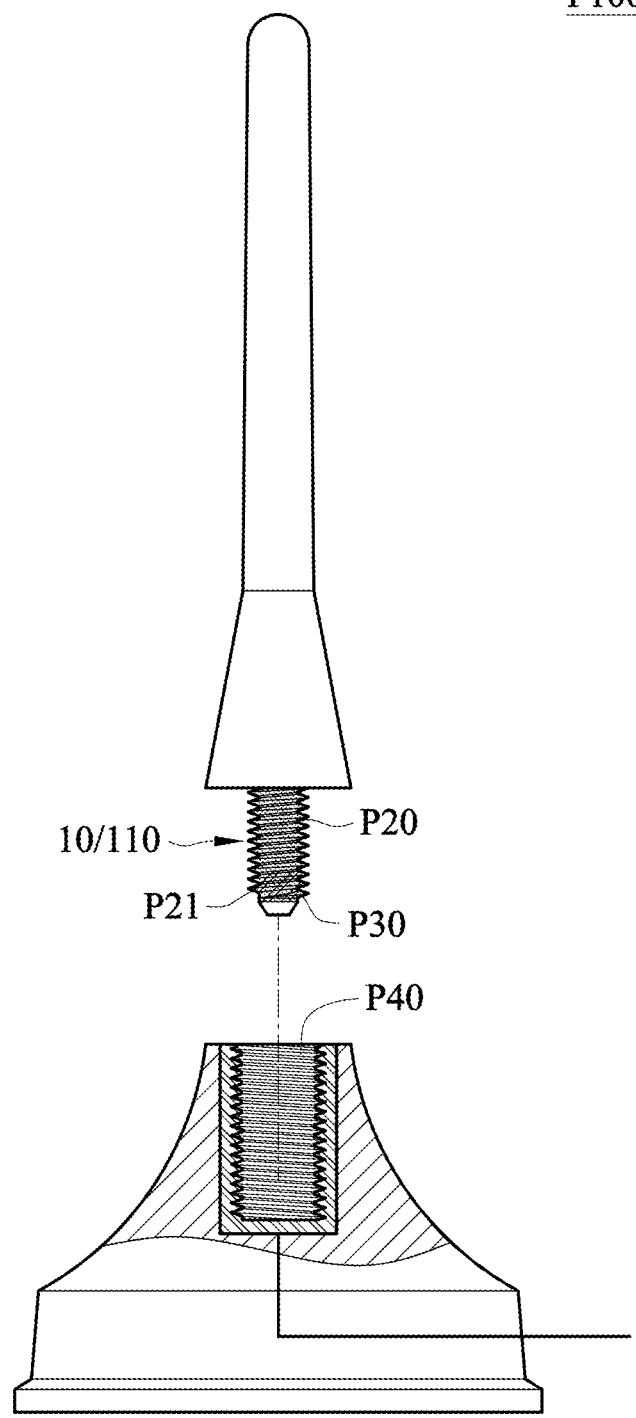
FIG. 1A is a schematic drawing showing an antenna with a conventional sealing fastener.
Figure 1B:
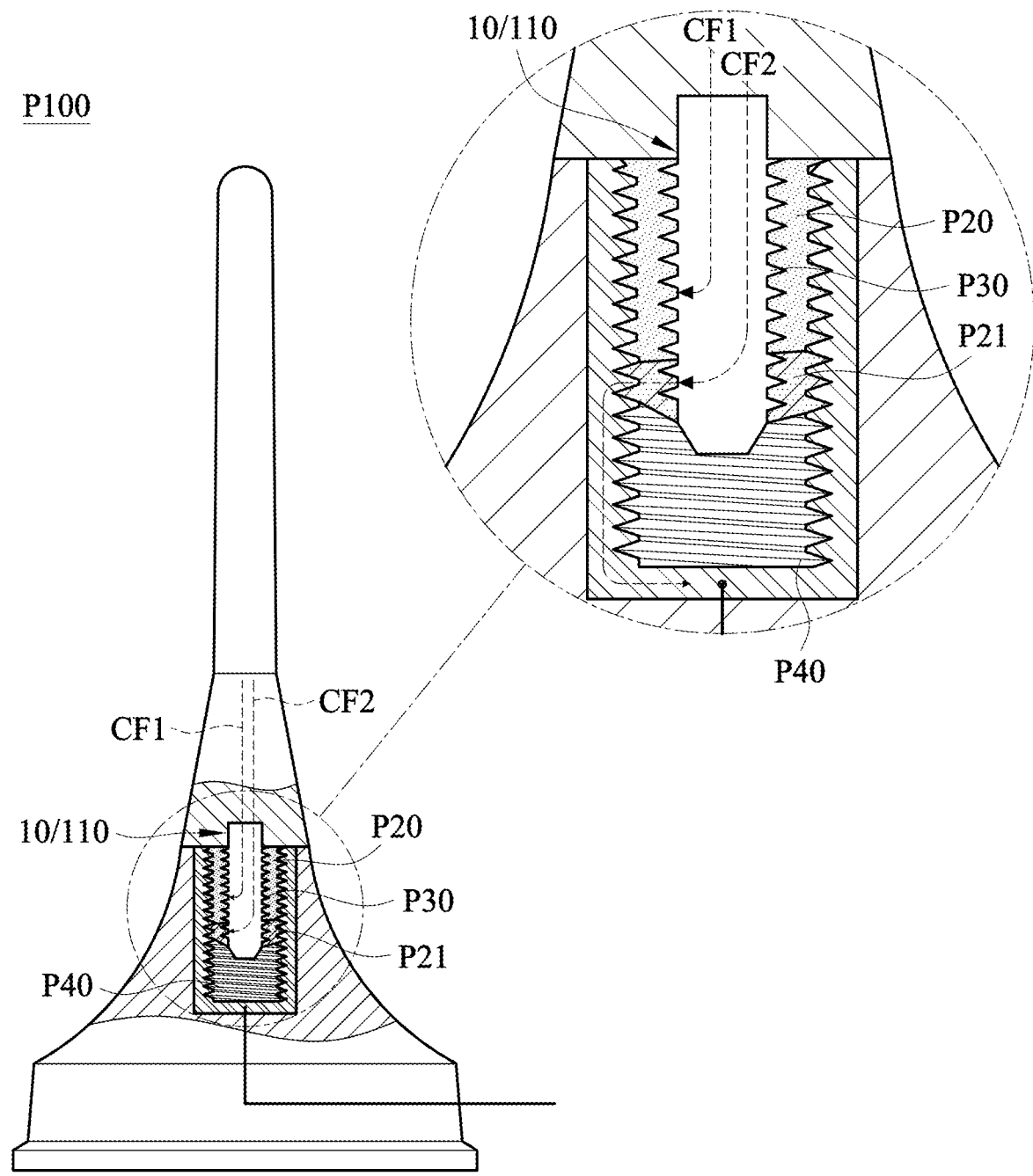
FIG. 1B is a schematic drawing showing single transmission in an antenna with a conventional sealing fastener.
Figure 2A:
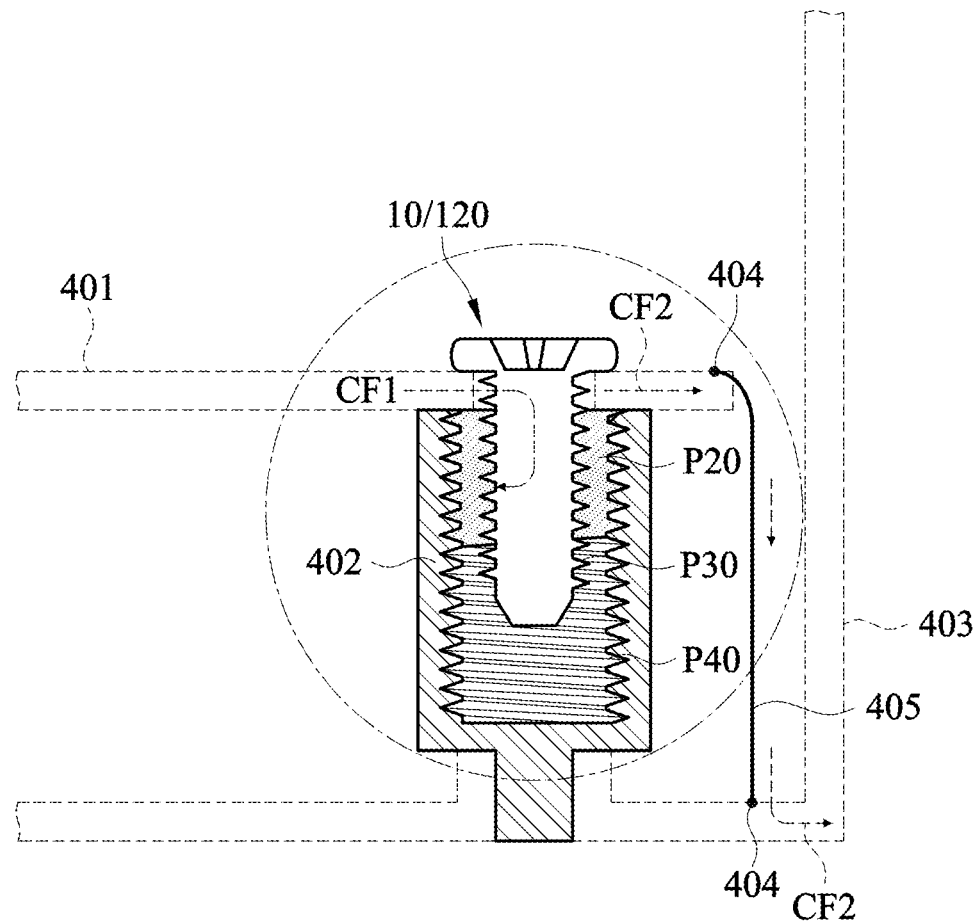
FIG. 2A is a schematic drawing showing a ground screw with a conventional locking fastener.
Figure 2B:
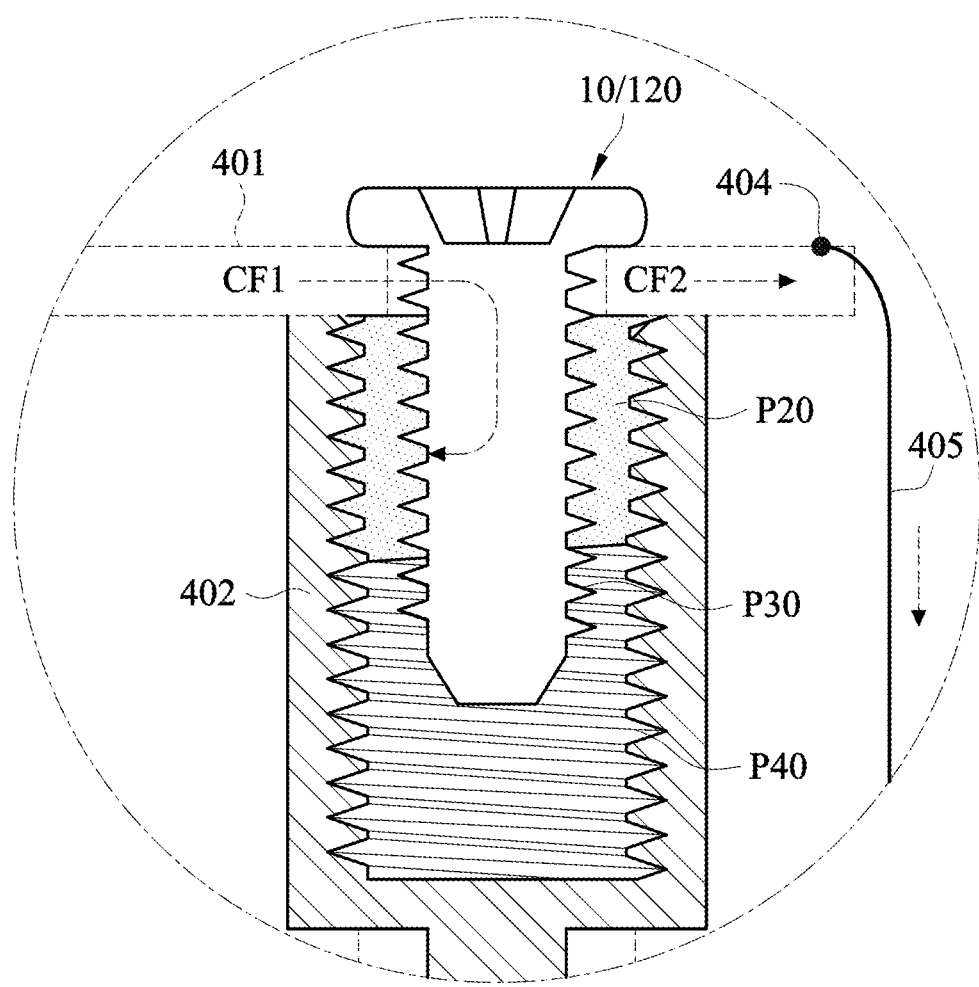
FIG. 2B is a partial sectional view of the FIG. 2A.

As shown in FIG. 3A, FIG. 4A, FIG. 5A, and FIG. 6A, an integrated locking and sealing fastener with electrical conductivity 100 according to the present invention includes a fastener 10 and a conductive anti-loosening coating 20.

The fastener 10 can be a mechanical component formed by one component only or a plurality of components fixed in a mechanical way. For example, the fastener 10 can be an antenna fastener 110, a ground screw 120, etc. The fastener 10 is provided with a surface and a part of the surface is a fastening contact surface.

More specifically, the fastening contact surface is the contact surface between the fastener 10 and screw threads 140 of a base. For example, it can be a screw thread surface 130 of the antenna fastener 110/or the ground screw 120, or a surface of the base.

The conductive anti-loosening coating 20 is formed on the fastening contact surface. That means the conductive anti-loosening coating 20 is formed on the screw thread surface 130 of the antenna fastener 110/or the ground screw 120, or the surface of the base. According to the functions required, the conductive anti-loosening coating 20 can also be replaced by a conductive locking and sealing coating 30. The coating layer can be attached to the fastener in different ways such as half-round, opposite side, all-round, bearing surface, head, etc.

The conductive anti-loosening coating 20 is used to make the contact surface between the fastener 10 and the screw threads 140 of the base have electrical conductivity and anti-loosening effect. In order to achieve the above purpose, the conductive anti-loosening coating 20 consists of an anti-loosening portion 210 and a conductive portion 220.

Figure 3A:
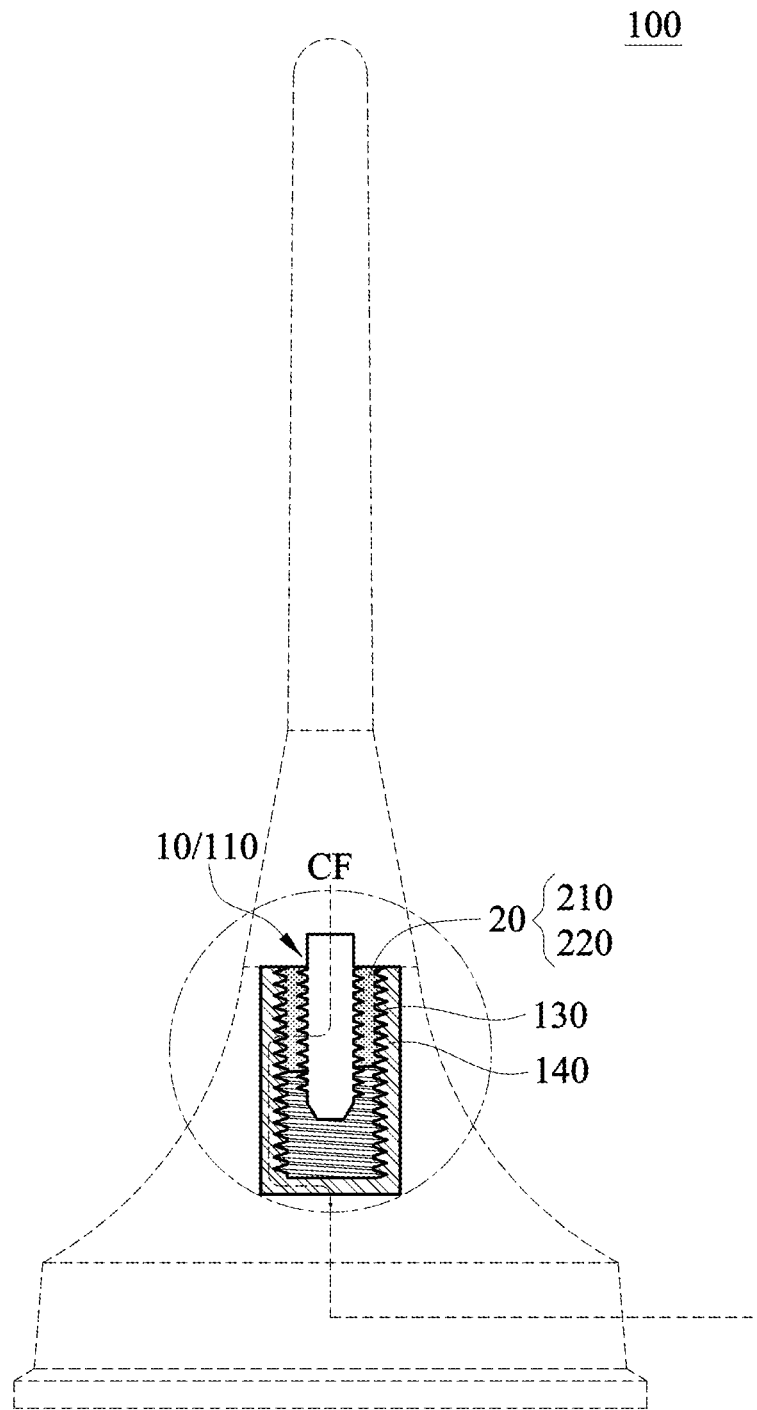
FIG. 3A is a schematic drawing showing an antenna with an embodiment of an integrated locking fastener with electrical conductivity according to the present invention.
Figure 3B:
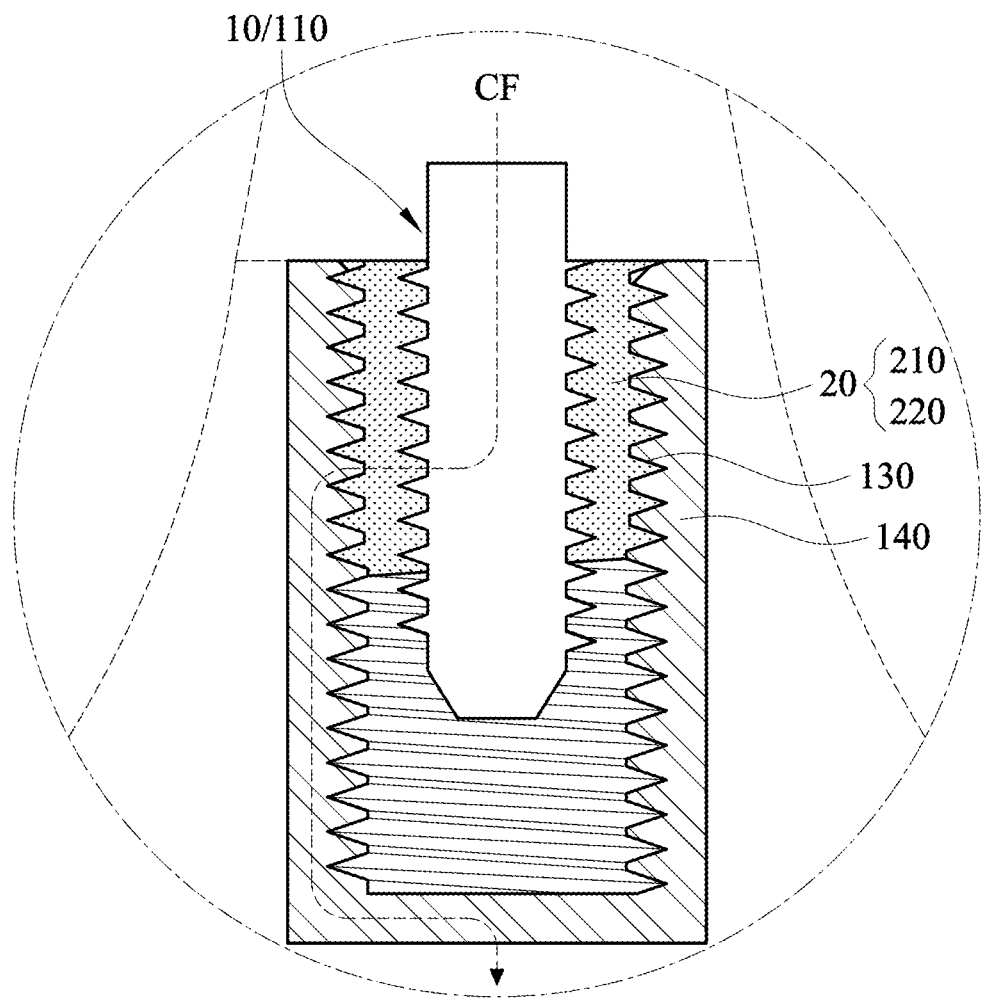
FIG. 3B is a partial sectional view of the FIG. 3A.
Figure 4A:
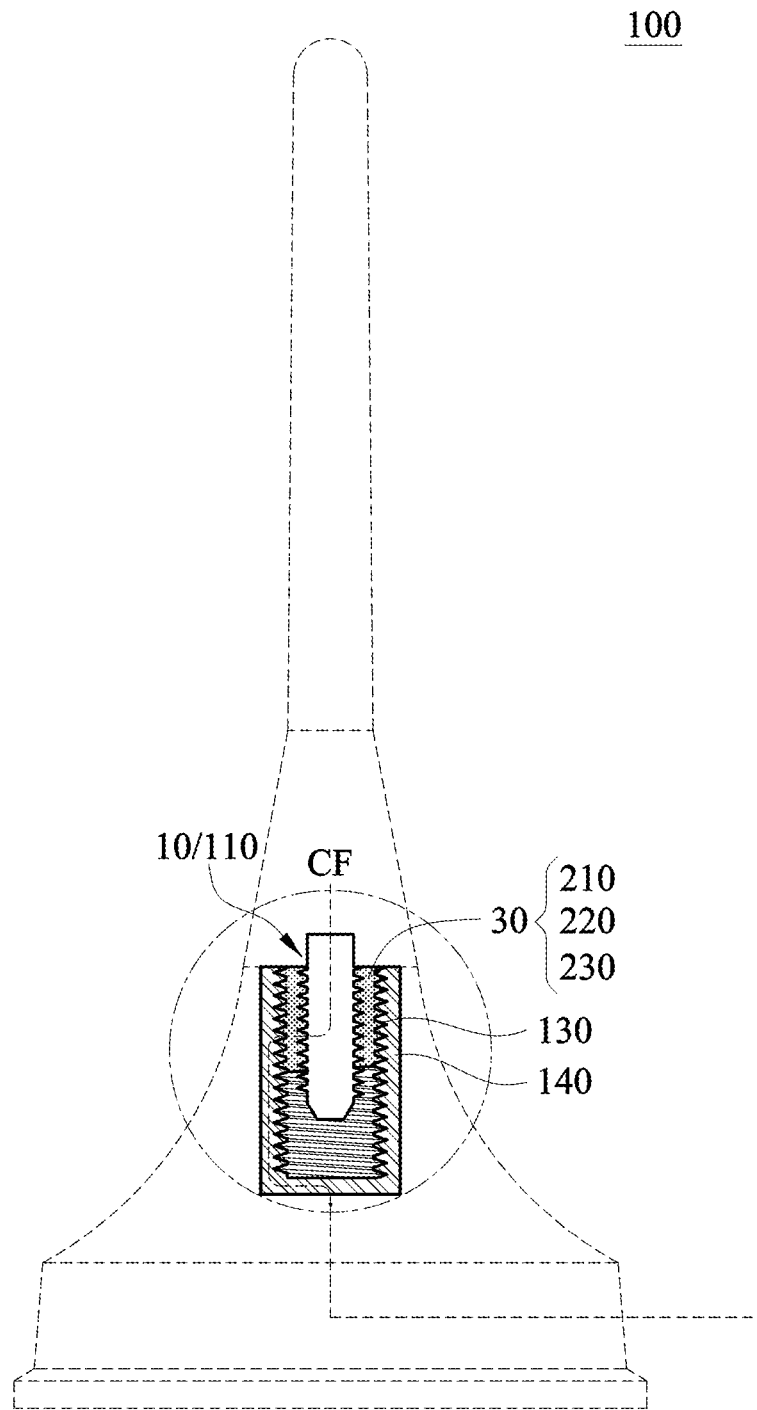
FIG. 4A is a schematic drawing showing an antenna with an embodiment of an integrated locking and sealing fastener with electrical conductivity according to the present invention.
Figure 4B:
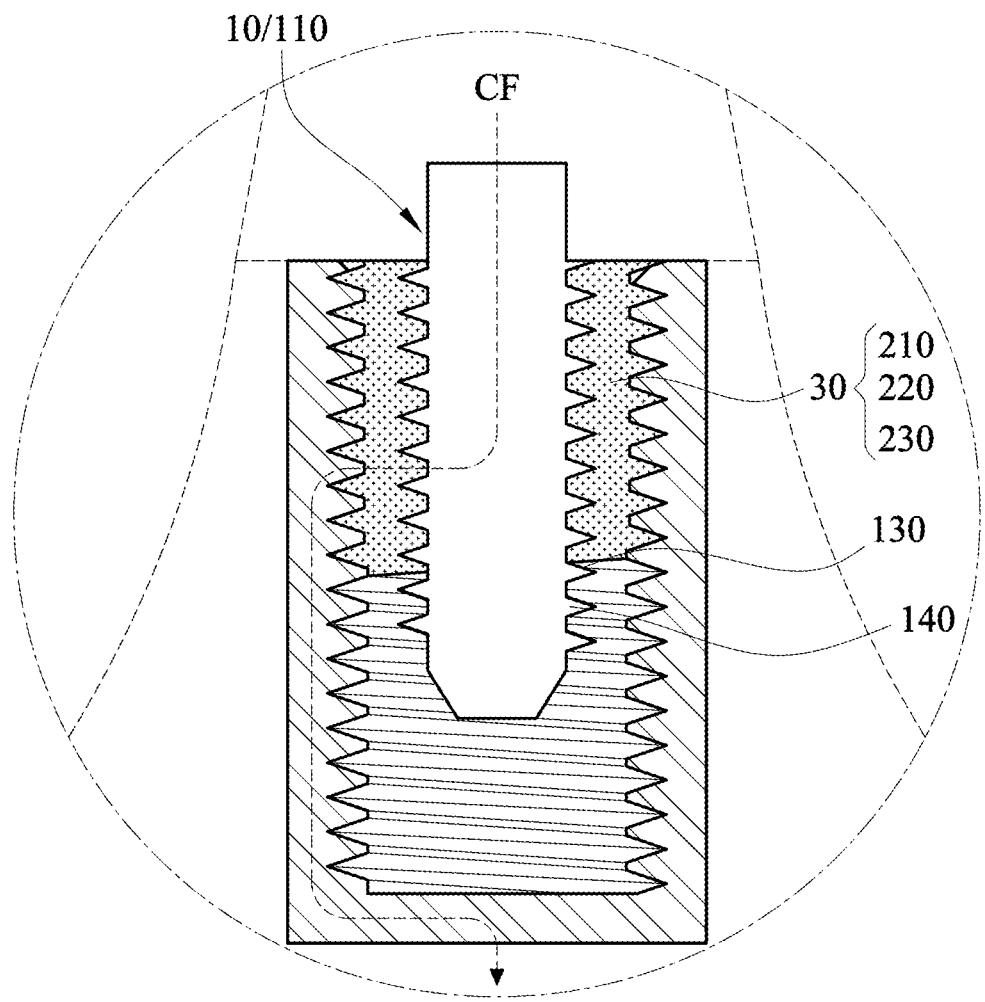
FIG. 4B is a partial sectional view of the FIG. 4A.

As shown in FIG. 3B and FIG. 4B, when a locking and sealing fastener with electrical conductivity 100 is applied to an antenna for connection to an antenna base, the conductive anti-loosening coating 20 or the conductive locking and sealing coating 30 is coated on a part of the screw thread surface 130 of the antenna fastener 110.

The conductive anti-loosening coating 20 or the conductive locking and sealing coating 30 provides electrical conductivity. Thus after flowing through the screw thread surface 130 of the fastener 10/110, a current flow CF passes through the conductive anti-loosening coating 20 or the conductive locking and sealing coating 30 and keeps flowing to the screw threads 140 of the base. Thereby the antenna fastener 110 strikes a balance between anti-loosening effect and signal transmission performance.

Figure 5A:
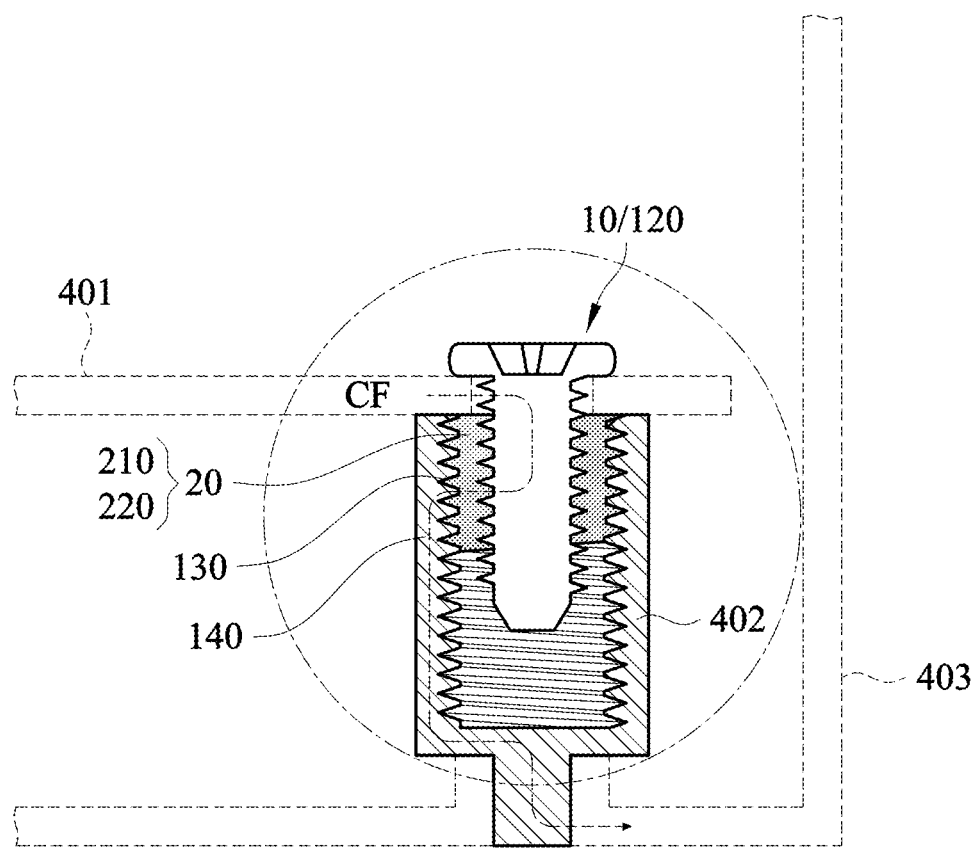
FIG. 5A is a schematic drawing showing a ground screw with an embodiment of an integrated locking fastener with electrical conductivity according to the present invention.
Figure 5B:
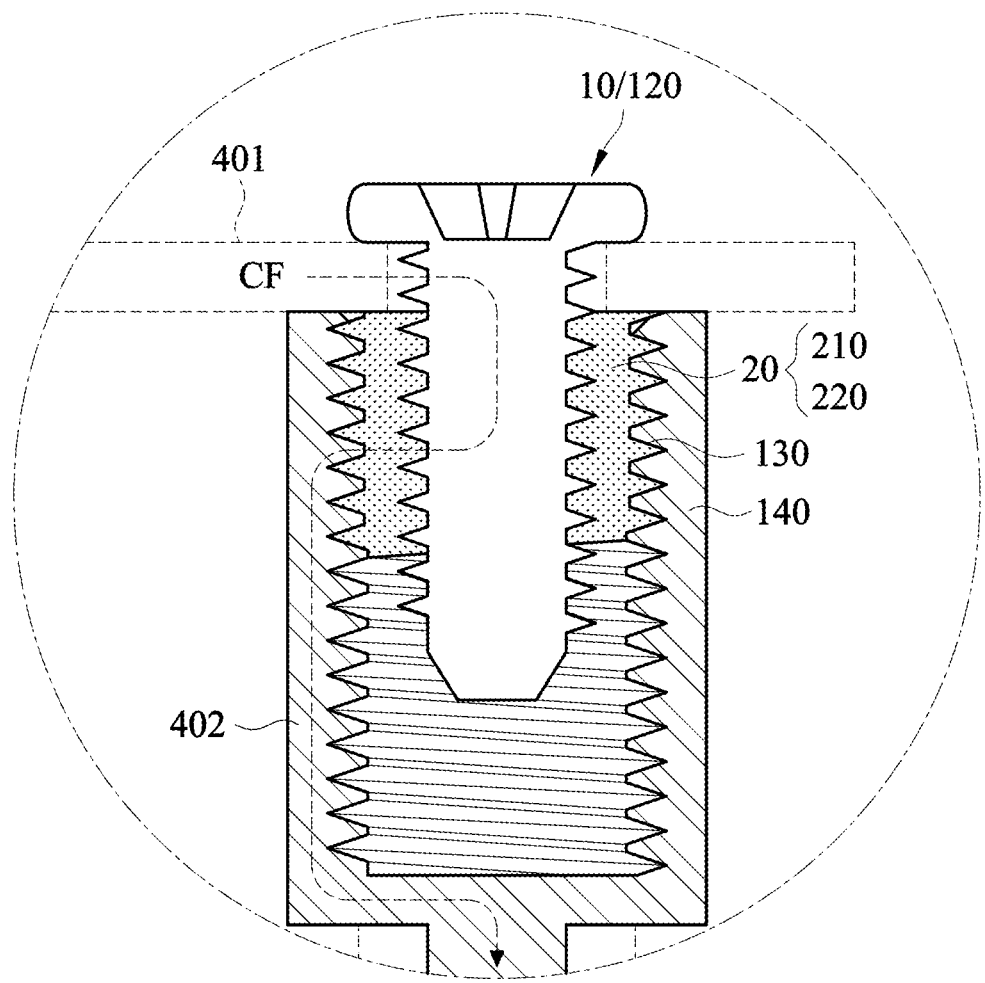
FIG. 5B is a partial sectional view of the FIG. 5A.
Figure 6A:
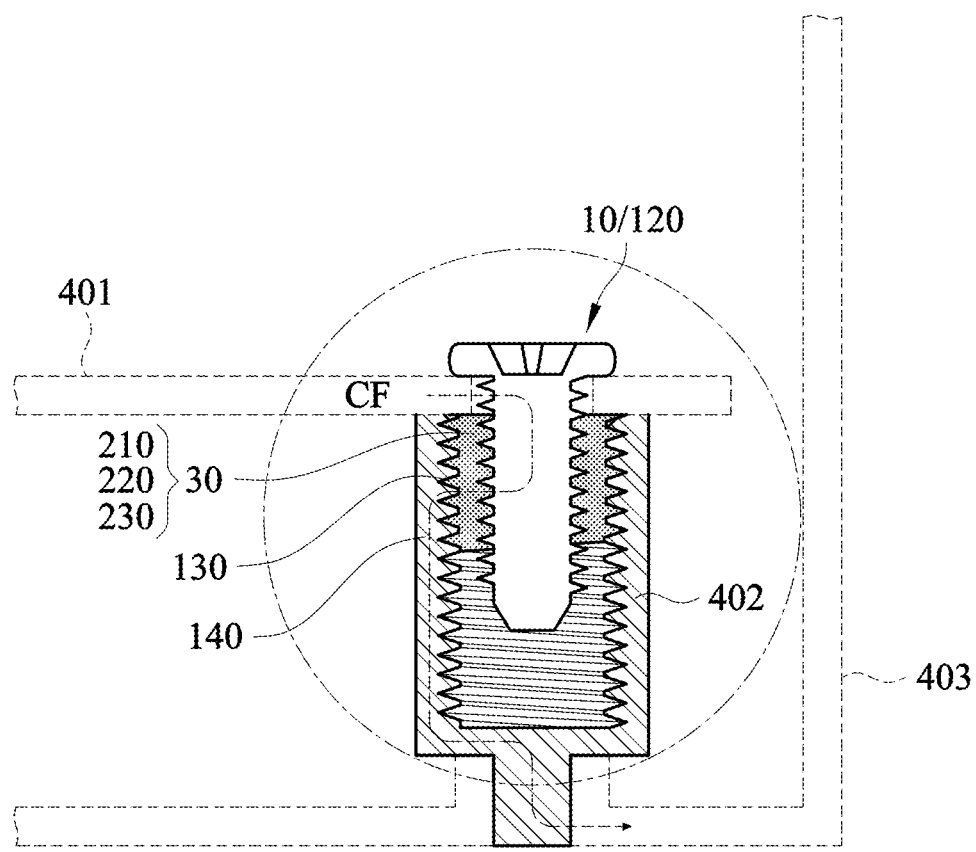
FIG. 6A is a schematic drawing showing a ground screw with an embodiment of an integrated locking and sealing fastener with electrical conductivity according to the present invention.
Figure 6B:
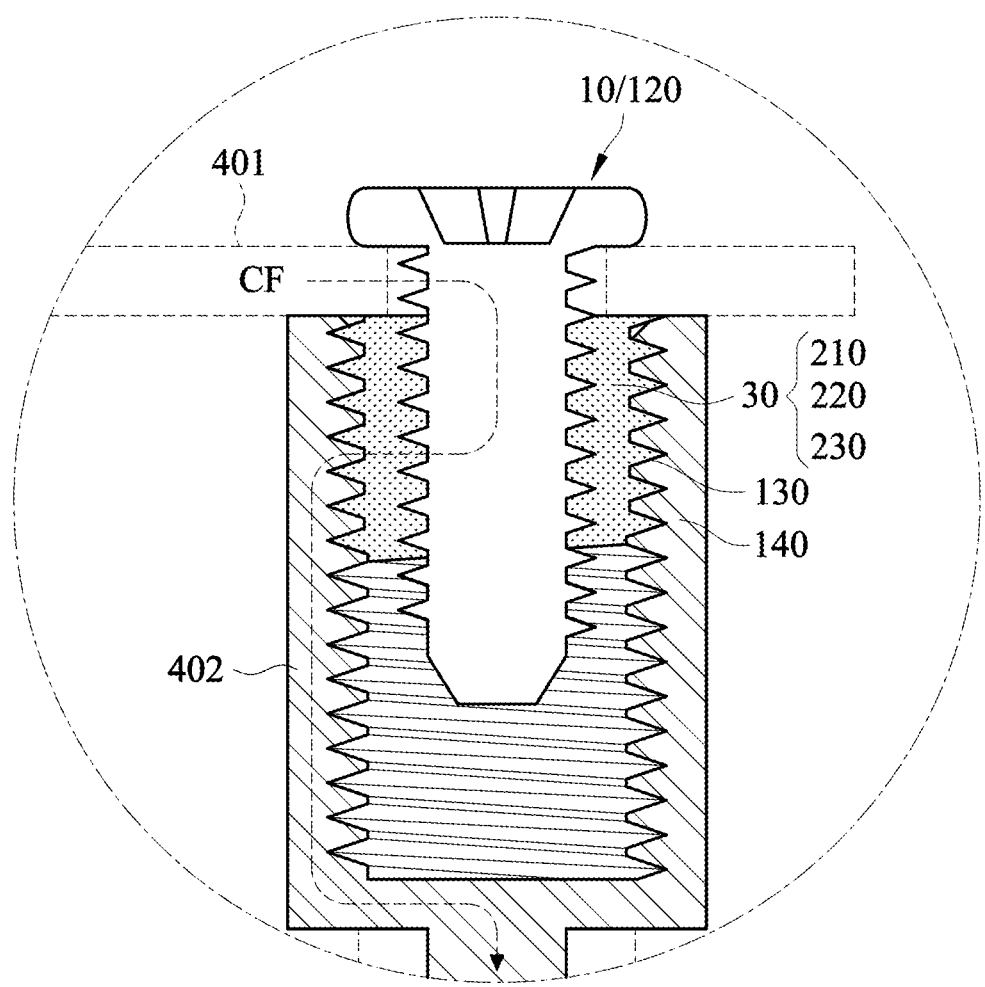
FIG. 6B is a partial sectional view of the FIG. 6A.

As shown in FIG. 5B and FIG. 6B, a conductive locking and sealing ground screw 120 of this embodiment is applied to provide a ground connection between a circuit board 401 and a metal case 403. The circuit board 401, a boss 402 and the metal case 403 are connected and fixed by the ground screw 120 in which the conductive anti-loosening coating 20 or the conductive locking and sealing coating 30 is coated on the screw thread surface 130 thereof. The conductive anti-loosening coating 20 or the conductive locking and sealing coating 30 is tightly connected to screw threads 140 of the boss 402 to prevent the ground screw 120 and the boss 402 from loosening or falling out.

Moreover, the conductive anti-loosening coating 20 or the conductive locking and sealing coating 30 has electrical conductivity. After passing through the screw thread surface 130 of the fastener 10, the current flow CF flows through the conductive anti-loosening coating 20/or the conductive locking and sealing coating 30, then keep passing the boss 402 and the metal case 403, and finally being grounded. The ground screw 120 with the conductive anti-loosening coating 20/or the conductive locking and sealing coating 30 gets a balance between loosening resistance and grounding function.

In order to increase the friction coefficient of the contact surface between the fastener 10 and screw threads 140 of the base for preventing the fastener 10 and the base already fixed from loosening due to vibrations, the coating layer is designed into an anti-loosening portion 210 made from materials selected from polyamide (PA) resin, acrylic (polymethyl methacrylate, PMMA) resin, polyethylene, epoxy resin, silicone, rubber, and their combinations.

The anti-loosening portion 210 is made from insulating materials. The conductive portion 220 is mixed into the anti-loosening portion 210 in order to make the anti-loosening portion 210 have electrical conductivity. The conductive portion 220 is made from materials including carbon black, metal powders, a silver wire, graphite, or the combinations thereof. Thereby the fastener 10 connected with the coating layer not only provides anti-loosening effect but also has electrical conductivity.

In order to make the conductive anti-loosening coating 20 have a sealing effect, the anti-loosening portion 210 is further mixed with a sealing portion 230 made from fluorine resin, polyurethane and the combination. Thus the conductive anti-loosening coating 20 turns into the conductive locking and sealing coating 30 with good elasticity. This enables the conductive locking and sealing coating 30 to have a closer contact with the fastener 10/or the screw threads 140 of the base. Thereby the fastener 10 further provides a sealing effect.

The electrical conductivity of the conductive locking and sealing coating 30 can be confirmed by the electrical impedance measurement. For example, the ground screw 120 is coated all-round with the coating layer and the thickness thereof meets the requirement for anti-loosening performance. Measure the electrical impedance on area with the coating layer. The result indicates that ground screw 120 provided with the conductive locking and sealing coating 30 has a low resistance and this represents that the coating layer is electrically conductive. By contrast, the conventional locking and sealing material with the same thickness of the coating layer has infinite resistance and this means the coating layer is insulated.

For evaluation of anti-loosening effect of the material used, perform torque tests of the coating layer with the same thickness mentioned above. For example, IFI-524 or IFI-124 standards/test procedures are used. IFI stands for Industrial Fasteners Institute. The integrated locking and sealing M2 ground screw is driven in and out for 5 times so that there are 5 installation/removal cycles. The first installation torque, the first removal torque, and the fifth removal torque are measured and the results are shown in the following table. The screw meets performance requirements of IFI-524.

| M2 screw (IFI-524 standard) | first installation (≤2.04 kgf-cm) | first removal (≥0.2 kgf-cm) | fifth removal (≥0.1 kgf-cm) |
|---|---|---|---|
| Torque value | 0.73 | 0.55 | 0.21 |

The above description is only the preferred embodiments of the present invention, and is not intended to limit the present invention in any form. Although the invention has been disclosed as above in the preferred embodiments, they are not intended to limit the invention. A person skilled in the relevant art will recognize that equivalent embodiment modified and varied as equivalent changes disclosed above can be used without parting from the scope of the technical solution of the present invention. All the simple modification, equivalent changes and modifications of the above embodiments according to the material contents of the invention shall be within the scope of the technical solution of the present invention.

What is claimed is:

1. An integrated locking and sealing fastener with electrical conductivity comprising:
    a fastener having a surface provided with a fastening contact surface formed by a part of the surface; and
    a conductive anti-loosening coating that is arranged at the fastening contact surface and including:
        an anti-loosening portion made from polyamide (PA) resin, acrylic (polymethyl methacrylate, PMMA) resin, polyethylene, epoxy resin, silicone, rubber, and combinations thereof; and
        a conductive portion that is mixed in the anti-loosening portion and made from carbon black, metal powders, a silver wire, graphite and combinations thereof;
    wherein the fastener provides not only anti-loosening effect but also electrical conductivity.

2. The fastener as claimed in claim 1, wherein the fastener is an antenna fastener and the part of the surface is a part of a screw thread surface on the antenna fastener.

3. The fastener as claimed in claim 1, wherein the fastener is a ground antenna and the part of the surface is a part of a screw thread surface on the ground screw.

4. The fastener as claimed in claim 1, wherein the anti-loosening portion is further fixed with a sealing portion made from fluorine resin, polyurethane and the combination so that the fastener further provides a sealing effect.

5. The fastener as claimed in claim 4, wherein the fastener is an antenna fastener and the part of the surface is a part of a screw thread surface on the antenna fastener.

6. The fastener as claimed in claim 4, wherein the fastener is a ground antenna and the part of the surface is a part of a screw thread surface on the ground screw.

* * * * *